United States Patent [19]

Leiber et al.

[11] Patent Number: 4,579,145

[45] Date of Patent: Apr. 1, 1986

[54] PRESSURE CONTROL DEVICE

[75] Inventors: Heinz Leiber, Oberriexingen; Alwin Stegmaier, Schwieberdingen, both of Fed. Rep. of Germany

[73] Assignee: Robert Bosch GmbH, Stuttgart, Fed. Rep. of Germany

[21] Appl. No.: 616,429

[22] Filed: May 31, 1984

[30] Foreign Application Priority Data

Aug. 5, 1983 [DE] Fed. Rep. of Germany ... 8322570[U]

[51] Int. Cl.$^4$ .................................... F15B 13/044
[52] U.S. Cl. .................. 137/625.65; 137/312; 251/129.16
[58] Field of Search ............ 137/625.65, 312; 251/129, 129.16

[56] References Cited

U.S. PATENT DOCUMENTS

| | | | |
|---|---|---|---|
| 2,675,831 | 4/1954 | Jacques | 251/129 X |
| 2,916,252 | 12/1959 | Hobbs et al. | 251/129 |
| 3,788,597 | 1/1974 | Ichioka | 251/129 |
| 3,807,441 | 4/1974 | Grosseau | 137/625.65 X |
| 3,840,045 | 10/1974 | Grosseau | 137/625.65 X |
| 3,880,476 | 4/1975 | Belart et al. | 137/625.65 X |
| 3,902,527 | 9/1975 | Schwerin et al. | 137/625.65 |
| 3,967,648 | 7/1976 | Tirelli | 137/625.65 |
| 4,071,042 | 1/1978 | Lombard et al. | 251/129 X |
| 4,119,294 | 10/1978 | Schnorrenberg | 251/129 |
| 4,250,922 | 2/1981 | Will et al. | 137/625.65 |
| 4,535,816 | 8/1985 | Feder et al. | 137/625.65 |

FOREIGN PATENT DOCUMENTS 1240632 4/1960 France ................ 137/625.65

Primary Examiner—Gerald A. Michalsky
Attorney, Agent, or Firm—Michael J. Striker

[57] ABSTRACT

A pressure control device, preferably for use in a control system of an automatic transmission of a motor vehicle, comprises a housing which accommodates a magnetic coil and an armature, and a control slide actuated by the armature and movable within a valve through which pressure medium to be controlled passes. A plunger carrying the armature is arranged coaxially to the magnetic coil within the housing and is supported at the both ends axially. A diaphragm spring is arranged at the end of the plunger facing toward the control slide. A pin loaded with the control pressure and arranged at the end of the control slide opposite to that facing the plunger acts on the control slide. A compression spring provided on the armature develops a force which acts against the force of the electric magnet and the hydraulic force which acts on the pin. The pressure control device is therefor suitable for controlling of considerably higher pressures and greater volumes of the pressure medium.

3 Claims, 3 Drawing Figures

PRESSURE CONTROL DEVICE

BACKGROUND OF THE INVENTION

The present invention relates to a pressure control device for controlling pressure and volume of a pressure medium, for example in a control system of an automatic transmission of a motor vehicle.

Known pressure control devices of the type under discussion are suitable only for relatively low control pressure and relatively small pressure medium streams, which makes the use of such pressure control devices rather limited.

SUMMARY OF THE INVENTION

It is an object of the present invention to provide an improved pressure control device.

It is another object of the present invention to provid a pressure control device which is suitable for controlling of higher control pressures and greater amounts or volumes of pressu medium.

These and other objects of the present invention are attained by a pressure control device for controlling pressure of a flowing medium, comprising a housing; a magnetic coil;

an armature cooperating with said magnetic coil; a plunger having an axis and carrying said armature; said coil, said armature and said plunger being accommodated in said housing, said plunger having two ends and being coaxial with said coil; valve means having a casing; said casing having pressure medium admitting passage means and pressure medium discharging passage means for passing the pressure medium through said valve means, a control slide slidingly supported in said casing to generate a control pressure of the passing medium in said valve means; a bearing sleeve slidingly supporting the end of said plunger facing away from said control slide; a diaphragm spring having a periphery held in said housing; said diaphragm spring being connected to said plunger at the end of the plunger facing toward said control slide so that upon energization of said coil said armature and said plunger are movable in said housing; spring means positioned in said housing and acting on said control slide on the one hand and against the control pressure generated in said valve means on the other hand; and a pin arranged in said valve means and being loaded with control pressure, said valve means having a guide bore in which said pin is slidingly supported in the direction of the axis of said plunger.

The pin may be connected to one of said pressure medium discharging passage means to be loaded with control pressure.

The control slide may have an elongated central through bore in which the control pressure prevails.

The pin has an end face which may be positioned immediately against the plunger.

The end face of the pin may be positioned against said control slide while the control slide may be positioned against the plunger in the axial direction thereof.

The valve means may further include a guide member formed with the guide bore receiving the pin, said pin being formed at said end face with a flange positioned against said control slide.

The valve means may further include a compression spring positioned in said central through bore and adapted to urge the control slide against said pin.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
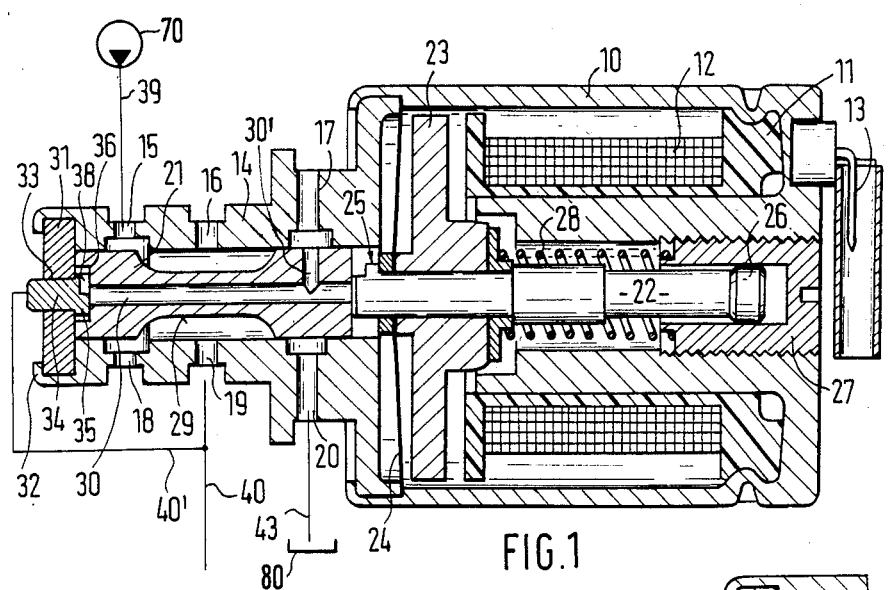
FIG. 1 is a sectional axial view through a pressure control valve according to the invention.

Referring now to the drawings in detail, and firstly to FIG. 1 thereof, the magnetically operated pressure control device includes a housing 10 in which a magnet coil member 11 carrying a coil 12 and a magnet armature 23 are accommodated. Coil 12 has an electrical connection 13 which extends outwardly from housing 10 in the known fashion. A valve casing 14 is attached to housing 10. Valve casing 14 is provided with pressure medium-admitting and pressure medium-discharging passages 15 through 20. These passages are a portion of a known hydraulic device not illustrated herein and operate for feeding and discharging the hydraulic pressure medium, for example in an automatic transmission of a motor vehicle. For adjusting a pressure and a stream of the fluid flowing through passages 15 to 20 serves a control slide 21 slidingly guided in a central opening of the valve casing 14.

Coaxially with the control slide 21 and with the coil 12 extends an elongated push rod or plunger 22 which carries the magnet armature 23. Plunger 22 at the end thereof facing towards control slide 21 is supported by a diaphragm spring 24 which is clamped at its periphery in the inner wall of housing 10. Reference character 25 designates a mechanical connection between plunger 22, armature 23 and diaphragm spring 24. This connection can be carried out, for example by calking provided at the portions of the plunger, armature and the spring, respectively.

Plunger 22 at its end facing away from control slide 21 merges into a bearing pin 26 which is guided in a bearing sleeve 27. Armature 23 is supported against bearing sleeve 27 by means of a compression spring 28.

The control slide 21 is formed with a relatively long central circular groove 29 on its periphery and also has a central elongated through bore 30. A transversal bore 30' branch off the central bore 30. This transversal bore is in communication with passage 17 connected to a return conduit 43 leading to a pressure medium container or tank 80. A guide disc 31 is arranged on the free end of valve casing 14. The guide disc 31 is held in the valve casing 14 by a bent-off peripheral flange rim 32. Disc 31 has a central bore 33 in which a pin 34 is received so that pin 34 can slightly slide within bore 33. Pin 34 has an enlarged flange or shoulder 35 which extends into a flat recess 36 formed at the end of control slide 31 facing the end face of disc 31. An elongated slot 38 is provided in the flange 35 of pin 34, which slot is in communication with the central bore 30 of control slide 21. A pressure medium is fed into the pressure control device from a pressure medium source 70 via a conduit 39 and passage 15. The control pressure generated in the pressure control device of the invention is transmitted via a conduit 40 to a consumer unit (not shown) and via a branch-off conduit 40' onto the outer end face of pin 34 extended outwardly from disc 31. Return conduit 43 leads from passage 20 to container 80.

If magnetic coil 12 of the pressure control device is energized then armature 23 will be pulled towards coil 12 thus causing the movement of control slide 21 therewith. Transverse forces exerted in an air gap between armature 23 and magnetic coil 12 are intercepted by the force of diaphragm spring 24; the slide bearing formed by bearing sleeve 27 and bearing pin 26 slided in sleeve 27 practically takes up no transverse forces. The magnetic force and hydraulic force act on the control slide 21, on the one hand, and the force of compression spring 28 acts against these two forces, on the other hand. The amount of leaking oil collected in the area between the control slide 21 and pin 34 is directed through the central bore 30 in control slide 21 into the return conduit 43.

The dimension of the diameter of control slide 21 determined for the pressure medium and the dimension of the diameter of pin 34 determined for an effective hydraulic force can be selected independently from each other.

Figure 2:
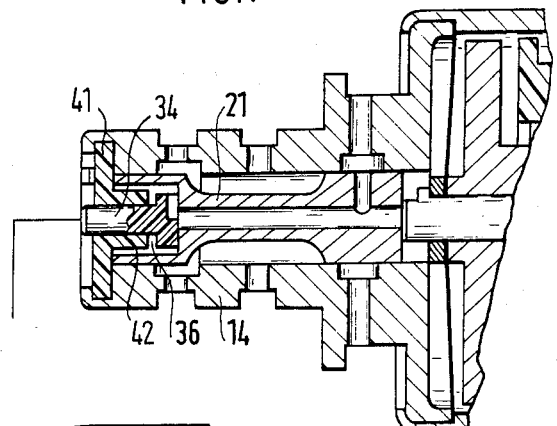
FIG. 2 is a partial sectional view through a modified embodiment of the pressure control valve.

With reference to FIG. 2 which illustrates another embodiment of the present invention it will be seen that only that portion of the pressure control device is shown in the drawing which is different from that described in connection with FIG. 1. In the modified embodiment of FIG. 2 pin 34 is somewhat longer than the pin of FIG. 1 and is slightly slidingly guided in a disc 41 secured in the valve casing 14 by the front end flange rim similarly to the embodiment of FIG. 1 and having a sleeve-like projection 42 extended in the recess 36 formed at the end of control slide 21.

Figure 3:
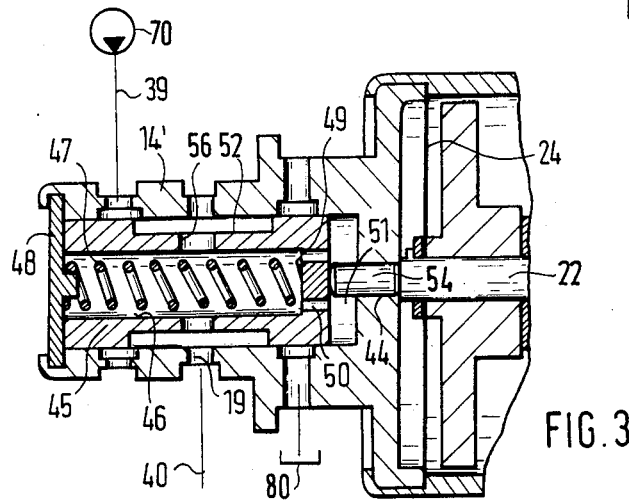
FIG. 3 is a partial sectional view through a still another modification of the pressure control valve.

In the further embodiment of the pressure control device shown in FIG. 3 still another construction of the pin is proposed. Pin 54 is slightly slidingly guided in a bore 44 formed in the portion of valve casing 14' which lies immediately on the diaphragm spring 24 and extends coaxially with the plunger 22. Pin 54 lies against the end face of the control slide which in this embodiment is designated by reference numeral 45. Control slide 45 has a central elongated bore 46 in which a compression spring 47 is accommodated. Compression spring 47 has one end supported against a disc-shaped plate 48, which closes valve casing 14' in the manner similar to discs 31 and 41 of FIGS. 1 and 2, and another end which is supported against the circular wall 49 of control slide 45.

Control slide 45 is provided with an elongated circular groove 52 formed on the periphery of the slide, which groove is in communication with central elongated bore 46 via at least one radially extended bore 56. The pressure medium is fed through passage 19 to a consumer line and also penetrates into central elongated bore 46 in the interior of the control slide via the radial bores 56. Inasmuch as the central elongated bore 46 has over the entire length of control slide 45 the same diameter and is connected through bores 50 with a chamber 51 formed in the valve casing 14 at the end face of control slide 45, the control slide 21 is pressure-compensated. The control pressure prevailing in the interior of control slide 45 acts also on pin 54 so that the magnetic force and the hydraulic force are again compensated by the force of the non-illustrated spring 28. Compression spring 47 has the purpose of urging control slide 45 against pin 54. The force component acting on the armature 23 is generated by pin 54. Thereby an adjustment of medium flow volumes and the effective force are obtained by respective dimensioning of the diameters of the control valve and the pin as in the instances of FIGS. 1 and 2. A further advantage of the pressure control device according to the invention resides in that because of the pressure force continually acting on the pin a leakage oil flow is always present in the space or chamber of the electric magnet. If this space is not pressure-sealed it is ensured that the electric magnet is in any case filled or passed by with the passing medium (oil). The presence of oil in the space of the electric magnet is important for damping an oscillation system.

The pressure control device according to the invention is specifically suitable for the adjustment of pressure in the automatic stepwise transmission of a motor vehicle. It should be understood that this invention, however is not limited to the utilization in motor vehicles but rather it can be applied wherever a hydraulic pressure is to be controlled.

It will be understood that each of the elements described above, or two or more together, may also find a useful application in other types of pressure control devices differing from the types described above.

While the invention has been illustrated and described as embodied in a pressure control device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure control device for controlling pressure of a flowing medium, comprising a housing; a magnetic coil; an armature cooperating with said magnetic coil; a plunger having an axis and carrying said armature; said coil, said armature and said plunger being accommodated in said housing, said plunger having two ends and being coaxial with said coil; valve means having a casing, said casing having pressure medium admitting passage means and pressure medium discharging passage means for passing the pressure medium through said valve means, a control slide having an elongated central bore and being slidingly supported in said casing to generate a control pressure of the passing medium in said valve means, said central bore being connected to said pressure medium discharging means; a bearing sleeve slidingly supporting the end of said plunger facing away from said control slide; a diaphragm spring having a periphery held in said housing; said diaphragm spring being connected to said plunger at the end of the plunger facing toward said control slide so that upon energization of said coil said armature and said plunger are movable in said housing; spring means positioned in said housing and acting on said control slide on the one hand and against the control pressure generated in said valve means on the other hand, and a pin arranged in said valve means and being loaded with control pressure, said valve means further including a guide member having a guide bore in which said pin is slidingly supported in the direction of the axis of said plunger, said pin having an end face and being formed at said end face with a flange positioned against said control slide and cooperating with said central bore whereby leaking pressure medium collected between said control slide and said pin is directed through said central bore into said pressure medium discharging means.

2. The pressure control device as defined in claim 1, wherein a plurality of said pressure medium discharge passage means are provided and wherein said pin is connected to one of said pressure medium discharging passage means to be loaded with control pressure.

3. The pressure control device as defined in claim 1, said control slide being positioned against said plunger in the direction of said axis.

* * * * *